US012747619B2

(12) United States Patent
Theodore, Jr. et al.

(10) Patent No.: US 12,747,619 B2
(45) Date of Patent: Sep. 29, 2026

(54) AIR CONDITIONER FOR A VEHICLE AND ITS MANUFACTURE

(71) Applicant: Hanon Systems, Daejeon (KR)

(72) Inventors: Michael G. Theodore, Jr., Plymouth, MI (US); Brian Laurain, Troy, MI (US); Olivia O'Dwyer, Oakland Township, MI (US); Rice Eddie, Novi, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/825,513

(22) Filed: Sep. 5, 2024

(65) Prior Publication Data

US 2025/0101785 A1 Mar. 27, 2025

Related U.S. Application Data

(60) Provisional application No. 63/584,689, filed on Sep. 22, 2023.

(51) Int. Cl.
*E05D 15/16* (2006.01)

(52) U.S. Cl.
CPC ...... *E05D 15/165* (2013.01); *E05Y 2201/706* (2013.01); *E05Y 2900/50* (2013.01)

(58) Field of Classification Search
CPC .... B60H 1/00692; E05F 15/62; E05F 15/619; E05F 15/603; E05F 15/624
See application file for complete search history.

(56) References Cited

U.S. PATENT DOCUMENTS

| | | | | |
|---|---|---|---|---|
| 5,918,418 | A * | 7/1999 | Richmond | E05F 15/684 49/139 |
| 6,019,156 | A * | 2/2000 | Wagner | E06B 9/13 160/310 |
| 6,622,787 | B1 | 9/2003 | Toyoshima et al. | |
| 6,955,338 | B2 * | 10/2005 | Okumura | B60H 1/00857 251/249.5 |
| 10,065,477 | B2 | 9/2018 | Sekito et al. | |

(Continued)

FOREIGN PATENT DOCUMENTS

| | | | |
|---|---|---|---|
| FR | 2237477 | A * | 7/1973 |
| KR | 200256886 | Y1 * | 12/2001 |

OTHER PUBLICATIONS

KR200256886Y1 English translation from WIPO (Year: 2002).*
FR2237477A5 English translation from espacenet (Year: 1975).*

*Primary Examiner* — Muhammad Ijaz
*Assistant Examiner* — Susan M. Heschel
(74) *Attorney, Agent, or Firm* — Shumaker, Loop & Kendrick, LLP; James D. Miller

(57) ABSTRACT

A sliding door assembly includes a door structure having a channel formed therein with the channel extending in an axial direction of the door structure. A first rotary drive structure is configured for selective rotation about an axis of rotation thereof. The first rotary drive structure includes a first drive body rollably received within the channel of the door structure. An engagement feature is configured to transfer the selective rotation of the first rotary drive structure about the axis of rotation thereof to linear translation of the door structure along the axial direction thereof and relative to the axis of rotation of the first rotary drive structure. The door structure may be formed by an extrusion or pultrusion manufacturing process.

14 Claims, 10 Drawing Sheets

(56) References Cited

U.S. PATENT DOCUMENTS

| | | | | |
|---|---|---|---|---|
| 2009/0120002 | A1* | 5/2009 | Domholt | E05F 15/619 49/340 |
| 2011/0059685 | A1* | 3/2011 | Ido | B60H 1/00692 454/69 |
| 2013/0008203 | A1* | 1/2013 | Makita | B60H 1/00857 62/515 |
| 2018/0081896 | A1* | 3/2018 | Stowe | G06F 16/248 |

* cited by examiner

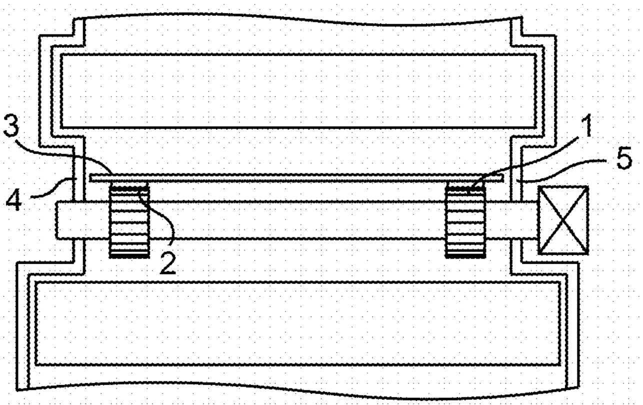
FIG. 1 - PRIOR ART
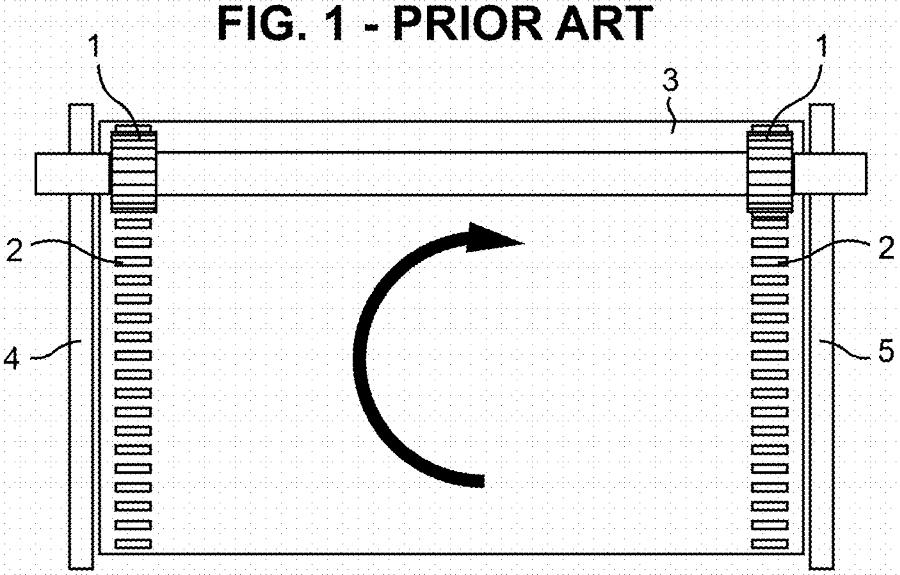
FIG. 2 - PRIOR ART
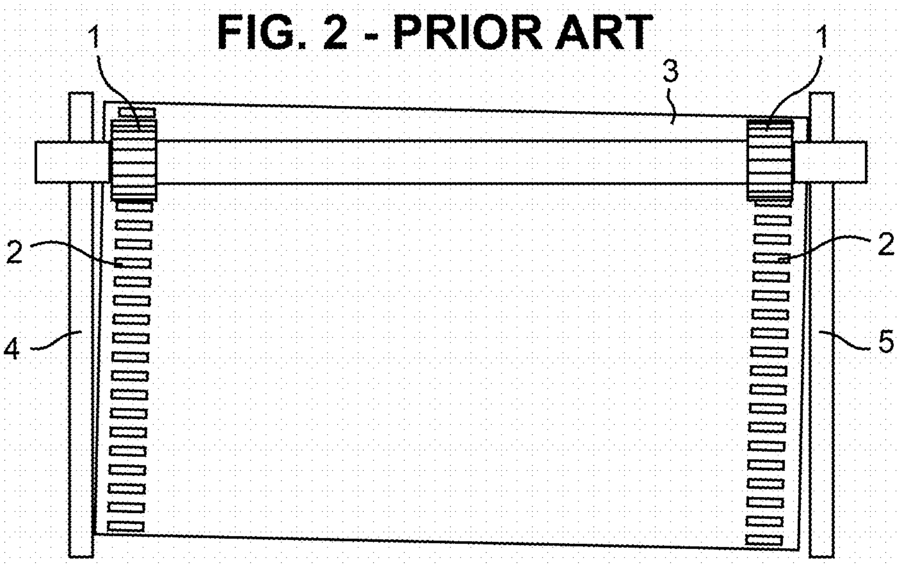
FIG. 3 - PRIOR ART

AIR CONDITIONER FOR A VEHICLE AND ITS MANUFACTURE

CROSS-REFERENCE TO RELATED APPLICATION

This patent application claims priority to U.S. Provisional Patent Application Ser. No. 63/584,689, filed on Sep. 22, 2023, the entire disclosure of which is hereby incorporated herein by reference.

FIELD

The invention relates to a sliding door assembly of a vehicle air conditioner/heating, ventilating, air conditioning (HVAC) unit, and more specifically, to a sliding door assembly having a centrally located rotary drive mechanism for guiding motion of a door structure.

BACKGROUND

It is known to utilize a sliding door assembly within an HVAC unit for controlling distribution of a flow of air between different flow paths, such as is described with respect to the HVAC units disclosed in each of U.S. Pat. Nos. 6,622,787 and 10,065,477, each of which is hereby incorporated herein by reference in its entirety. As shown in FIGS. 1-3, one such assembly includes a pair of geared shafts 1 that are configured to interface with a corresponding pair of toothed racks 2 extending along lateral sides of a door structure 3 slidably received between opposing wall segments 4, 5 of a flow path.

A problem arises with the disclosed configuration when the geared shafts 1 and/or the toothed racks 2 are not precisely molded/formed. As shown in FIGS. 2 and 3, if the gears 1 or racks 2 are not precisely formed, one side of the gear and rack interface will engage before the other. As a result, a couple, moment, or torque occurs. Once the torque occurs, the door structure 3 will become misaligned within its guide path as formed between the wall segments 4, 5. Once the door structure 3 becomes misaligned within its intended path, the corners of the door structure 3 contact the side guide rails formed by the wall segments 4, 5. When corner contact occurs, the door structure 3 binds/seizes and cannot slide as intended. Besides proper door function being disrupted, the gear shafts 1 may continue to rotate and may skip teeth thereof over the teeth of the toothed rack 2, which creates an offensive grinding noise emanating from the HVAC unit.

As a result of the sliding door and gear shaft requiring high manufacturing precision, the prior art design is difficult to manufacture. Thus, a need for a simplified manufacturing process and improved sliding door assembly is evident.

SUMMARY

Consistent and consonant with the present invention, an improved and simplified sliding door assembly and method of manufacturing the same are disclosed.

In an embodiment of the present invention, a sliding door assembly includes a door structure having a channel formed therein with the channel extending in an axial direction of the door structure. A first rotary drive structure is configured for selective rotation about an axis of rotation thereof. The first rotary drive structure includes a first drive body rollably received within the channel of the door structure. An engagement feature is configured to transfer the selective rotation of the first rotary drive structure about the axis of rotation thereof to linear translation of the door structure along the axial direction thereof and relative to the axis of rotation of the first rotary drive structure. The door structure may be formed by an extrusion or pultrusion manufacturing process.

A method of manufacturing a sliding door assembly according to the present disclosure is also provided, and includes the steps of: extruding or pultruding a strip of door material, the strip of door material including a constant cross-sectional shape extended in an axial direction of the strip of door material corresponding to the direction of extrusion or pultrusion thereof, the constant cross-sectional shape including formation of an axially extending channel in the strip of door material; separating an axial length of the extruded or pultruded strip of door material therefrom to form a door structure having the axially extending channel formed therein; and inserting a rotary body of a rotary drive structure in the channel of door structure with an engagement feature of the sliding door assembly configured to transfer selective rotation of the rotary drive structure about an axis of rotation thereof to linear translation of the door structure along the axial direction thereof and relative to the axis of rotation of the rotary drive structure.

BRIEF DESCRIPTION OF THE DRAWINGS

The above, as well as other advantages of the present invention will become readily apparent to those skilled in the art from the following detailed description of a preferred embodiment when considered in the light of the accompanying drawings in which:

FIG. 1 is a fragmentary cross-sectional elevational view of an HVAC unit having a sliding door assembly according to the prior art;

FIG. 2 is a schematic drawing showing a sliding door for an HVAC unit according to the prior art;

FIG. 3 is a schematic drawing showing the sliding door of FIG. 2 when misaligned;

DETAILED DESCRIPTION OF EXEMPLARY EMBODIMENTS OF THE INVENTION

Figure 4:
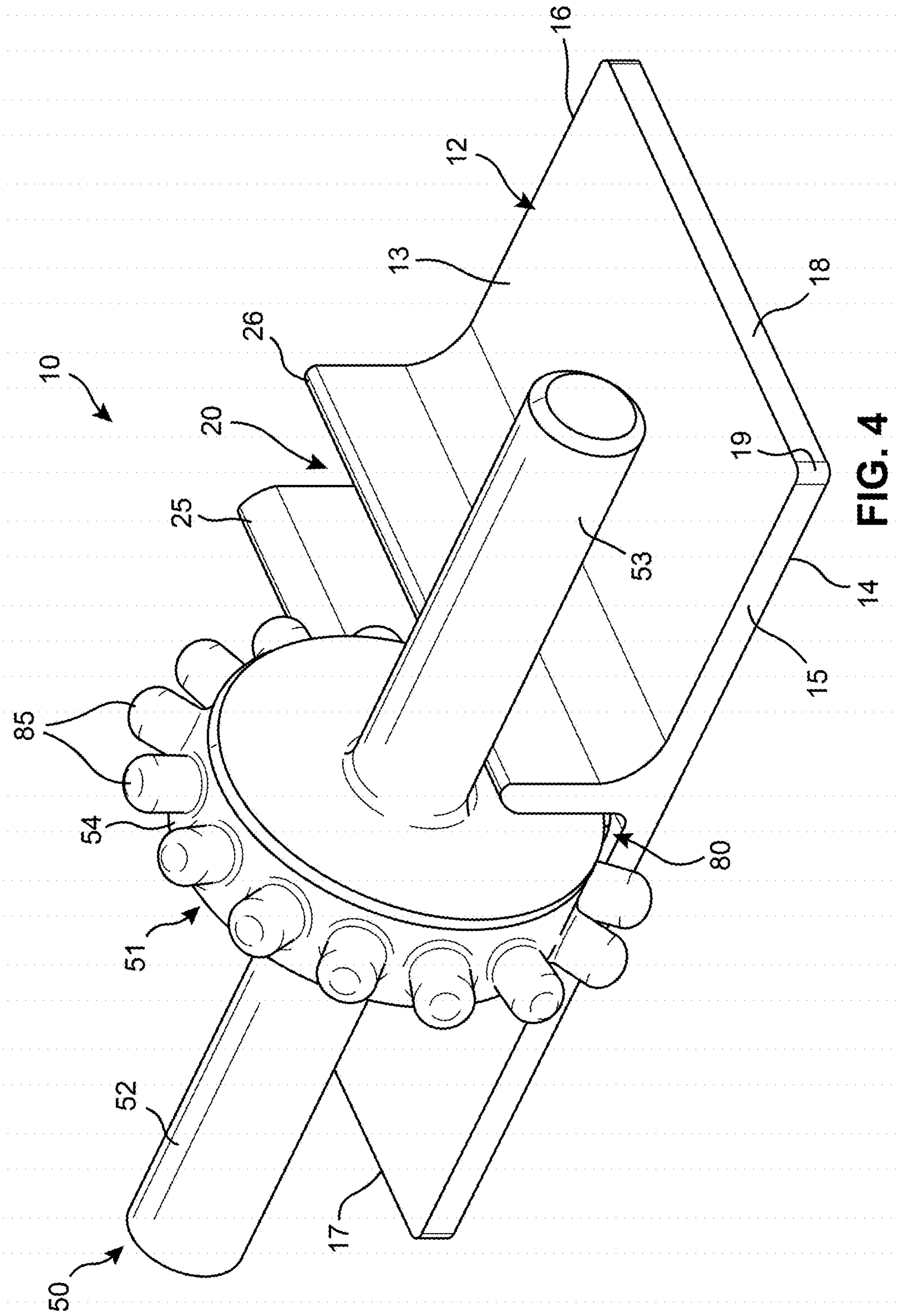
FIG. 4 is a perspective view showing a sliding door assembly according to an embodiment of the present invention.

The following detailed description and appended drawings describe and illustrate various exemplary embodiments of the invention. The description and drawings serve to enable one skilled in the art to make and use the invention, and are not intended to limit the scope of the invention in any manner.

"A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "top," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 4-7 illustrate a sliding door assembly 10 according to an embodiment of the present invention. The sliding door assembly 10 generally includes a door structure 12, a rotary drive structure 50, and an engagement feature 80 configured to transfer rotational motion of the rotary drive structure 50 to a sliding motion of the door structure 12 in a direction perpendicular to an axis of rotation of the rotary drive structure 50. As shown schematically in FIG. 5, the sliding door assembly 10 may be associated with a rotary drive mechanism 95 configured to selectively rotate the rotary drive structure 50 about the axis of rotation thereof in either of two opposing rotational directions. The rotary drive mechanism 95 may be an electric motor, such as a stepper motor, brushless DC motor, or the like, as non-limiting examples. The rotary drive mechanism 95 and the rotary drive structure 50 may form a rotary drive assembly including the rotary drive mechanism 95 forming a stator of the rotary drive assembly and the rotary drive structure 50 forming a rotor of the rotary drive assembly.

The door structure 12 is formed by an extrusion or pultrusion process to result in the door structure 12 having a constant cross-sectional shape that is extended in the direction of extrusion/pultrusion of the material forming the door structure 12, wherein the direction of extrusion/pultrusion corresponds to an axial direction of the door structure 12 along which the door structure 12 is configured to slide relative to the rotary drive structure 50 during adjustment of the sliding door assembly 10. The door structure 12 may be formed to include a substantially wall or plate-like configuration wherein the door structure 12 includes a first major surface 13 and an oppositely arranged second major surface 14, wherein the major surfaces 13, 14 are spaced apart from each other with respect to a thickness direction of the door structure 12 arranged perpendicular to the axial direction thereof. The major surfaces 13, 14 extend primarily in each of the axial direction of the door structure 12 and a lateral direction of the door structure 12 that is arranged perpendicular to the axial and thickness directions thereof. The major surfaces 13, 14 are each shown as being substantially planar and arranged parallel to each of the axial direction and the lateral direction, but the major surfaces 13, 14 may have substantially any shape or configuration so long as the major surfaces 13, 14 extend sufficient distances in the axial and lateral directions to ensure that the major surfaces 13, 14 sufficiently cover a desired portion of a flow path associated with the sliding door assembly 10, which may include the major surfaces 13, 14 including deviations in the thickness direction as the door structure 12 extends in the lateral direction to result in a non-planar configuration. For example, the door structure 12 may include projecting features or thickened portions for reinforcing or stiffening the door structure 12, may be spaced apart a greater thickness along certain lateral portions thereof, may include arcuate or inclined portions extending partially in the lateral and thickness directions, or may include flow control features formed therein for directing a fluid therealong, all of which are extended in the axial direction of extrusion/pultrusion of the door structure 12.

A first axial end surface 15 connects the major surfaces 13, 14 at a first axial end of the door structure 12 while a second axial end surface 16 connects the major surfaces 13, 14 at an oppositely arranged second axial end of the door structure 12. A first lateral side surface 17 connects the major surfaces 13, 14 along a first lateral side of the door structure 12 while a second lateral side surface 18 connects the major surfaces 13, 14 along an oppositely arranged second lateral side of the door structure 12. The axial end surfaces 15, 16 extend primarily in the lateral and thickness directions of the door structure 12 while the lateral side surfaces 17, 18 extend primarily in the axial and thickness directions of the door structure 12. In the illustrated embodiments, a convex arcuate surface 19 connects each of the axial end surfaces 15, 16 to an adjoining one of the lateral side surfaces 17, 18 to prevent the formation of sharp corners around the periphery of the door structure 12, although the door structure 12 may be formed in the absence of the convex arcuate surfaces 19, as desired.

The first major surface 13 of the door structure 12 is configured to face towards the rotary drive mechanism 50 and includes a channel 20 formed therein. The channel 20 is defined by an inwardly facing first lateral surface 21, an inwardly facing and oppositely arranged second lateral surface 22, and a base surface 23 extending laterally between the lateral surfaces 21, 22, wherein each of the surfaces 21, 22, 23 is formed along the first major surface 13. The lateral surfaces 21, 22 are shown as being disposed parallel to each of the axial direction and the thickness direction such that the lateral surfaces 21, 22 are disposed along parallel-arranged planes that are spaced apart from one another with respect to the lateral direction of the door structure 12. However, the lateral surfaces 21, 22 need not necessarily be arranged parallel to the thickness direction while remaining within the scope of the present invention, so long as the rotary drive structure 50 includes a complimentary and rotationally axially symmetric configuration mating with the channel 20 for preventing misalignment of the door structure 12, as explained in greater detail hereinafter. That is, the lateral surfaces 21, 22 may include alternative configurations, including extending at least partially in an outward lateral direction when projecting away from the base surface 23 in the outward thickness direction, while remaining within the scope of the present invention.

The base surface 23 may be provided as substantially planar when extending between and connecting the lateral surfaces 21, 22 and extends along a length of the channel 20. More specifically, the base surface 23 may be arranged on a plane extending parallel to the axial and lateral directions, wherein the plane of the base surface 23 may be arranged perpendicular to the lateral surfaces 21, 22 where the lateral surfaces 21, 22 are provided to be arranged on planes parallel to the axial and thickness directions as depicted in the present figures. In other circumstances, the lateral surfaces 21, 22 may each extend away from the plane of the base surface 23 while inclined relative thereto at an obtuse angle resulting in a widening of the channel 20 away from the base surface 23. In either event, the lateral surfaces 21, 22 are arranged transversely relative to the plane of the base surface 23 to result in the channel 20 being generally concave and absent any undercutting surfaces that could prevent rotation of the rotary drive structure 50 relative to the channel 20.

The embodiments illustrated herein include the first lateral surface 21 shown as the inwardly facing surface of a first wall segment 25 and the second lateral surface 22 as the inwardly facing surface of a second wall segment 26 spaced apart from the first projection 25 by the base surface 23 with respect to the lateral direction, wherein each of the wall segments 25, 26 are formed by portions of the first major surface 13 projecting outwardly in the thickness direction of the door structure 12 relative to adjacent portions of first major surface 13, such as projecting away from planar portions of the first major surface 13 arranged in the lateral and axial directions. However, the door structure 12 does not necessarily require that the channel 20 be formed in a portion of the door structure 12 that projects outwardly from the first major surface 13 with respect to the thickness direction in the form of such outwardly extending wall segments 25, 26, as the channel 20 may instead be formed to include the described surfaces 21, 22, 23 incorporated into the constant cross-section of the door structure 12 with respect to a variety of different configurations of the door structure 12, such as the channel 20 being formed in a portion of the door structure 12 bent to include a U-shape or a V-shape that is depressed relative to the first major surface 13 and projecting in the thickness direction relative to the second major surface 14, as desired.

The rotary drive structure 50 comprises a drive body 51, a first shaft segment 52, and a second shaft segment 53, each of which includes a substantially axially symmetric shape relative to an axis of rotation of the rotary drive structure 50. As depicted, each of the drive body 51, the first shaft segment 52, and the second shaft segment 53 may be substantially cylindrical in shape, as desired. The drive body 51 includes a cylindrically shaped outer circumferential surface 54, a first lateral face 55 disposed at a first axial end of the outer circumferential surface 54, and a second lateral face 56 disposed at a second axial end of the outer circumferential surface 54, wherein the outer circumferential surface 54 extends between the first lateral face 55 and the second lateral face 56 about a periphery of the drive body 51. The first shaft segment 52 extends axially outwardly from a center of the first lateral face 55 in a first lateral direction of the door structure 12 towards the first lateral side surface 17 and the second shaft segment 53 extends axially outwardly from a center of the second lateral face 56 in a second lateral direction of the door structure 12 towards the second lateral side surface 18. The shaft segments 52, 53 may include a common outer diameter and the outer circumferential surface 54 of the drive body 51 may include a greater outer diameter than the shaft segments 52, 53.

The drive body 51 is configured to be rollably received within the channel 20 of the door structure 12 such that lateral movement of the door structure 12 relative to the rotary drive structure 50 is prevented during rotational adjustment of the rotary drive structure 50 and the corresponding axial movement of the door structure 12 relative to the rotary drive structure 50. That is, the drive body 51 is received within the channel 20 such that at least a portion of the first lateral face 55 is facing towards and engaging or laterally stopped by the first lateral surface 21 of the channel 20 and at least a portion of the second lateral face 56 is facing towards and engaging or laterally stopped by the second lateral surface 22 of the channel 20 to prevent the relative lateral movement therebetween, wherein the engaging surfaces may include substantially complimentary shapes allowing for rotation and rolling of the drive body 51 within the channel 20. In the present embodiment, each of the lateral faces 55, 56 is arranged perpendicular to the laterally extending axis of rotation of the rotary drive structure 50, which corresponds to the lateral faces 55, 56 extending on planes that extend in parallel to the thickness and axial directions in the same manner as the lateral surfaces 21, 22. The lateral surfaces 21, 22 may be spaced apart in the lateral direction at a distance substantially matching the lateral distance present between the opposing faces 55, 56 to ensure that the drive body 51 is stably and securely received within the channel 20 such that undesirable misalignment does not occur between the drive body 51 and the channel 20 in a manner that could lead to undesired rotation of the door structure 12 relative to the drive body 51 about an axis extending in the thickness direction or the axial direction. As mentioned above, the surfaces 21, 22 and the faces 55, 56 need not be arranged perpendicular to the axis of rotation of the rotary drive body 50, but may instead be inclined or may include curvature when extending in the thickness direction, such as the lateral faces 55, 56 having frustoconical shapes that are complimentary to outwardly inclined lateral surfaces 21, 22 of the channel 20 to result in the channel 20 having a substantially trapezoidal or V-shaped configuration, as one non-limiting example.

The first shaft segment 52 and the second shaft segment 53 may be configured to rest upon or otherwise engage distally disposed surfaces of the first wall segment 25 and the second wall segment 26, respectively, such that the shaft segments 52, 53 are rollably disposed upon the distally disposed surfaces of the wall segments 25, 26 during axial movement of the door structure 12 relative to the axis of rotation of the rotary drive structure 50. The shaft segments 52, 53 rollably engaging the wall segments 25, 26 also establishes each of a maximum depth that the rotary drive body 51 may extend into the channel 20 with respect to the thickness direction and a resulting distance present between the outer circumferential surface 54 of the drive body 51 and the base surface 23 of the channel 20 with respect to the thickness direction.

Figure 5:
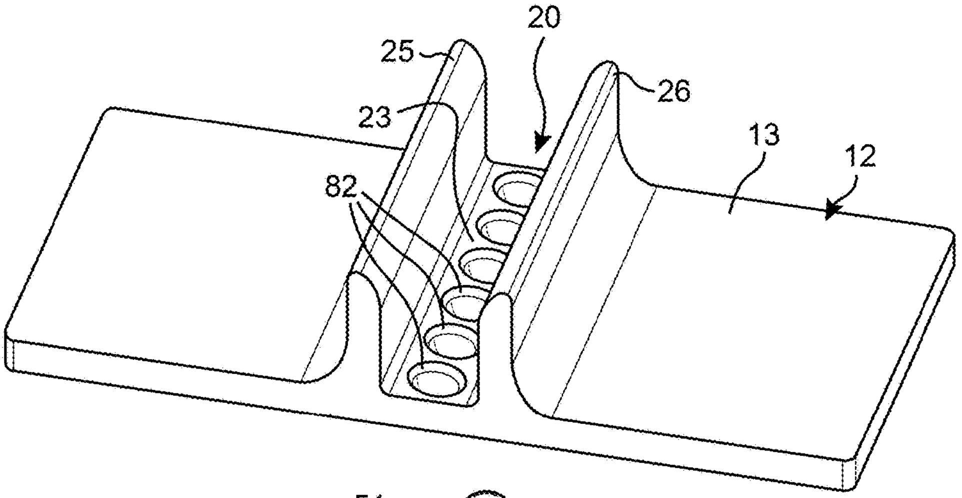
FIG. 5 is a perspective view showing a door structure of the sliding door assembly of FIG. 4 in isolation.
Figure 6:
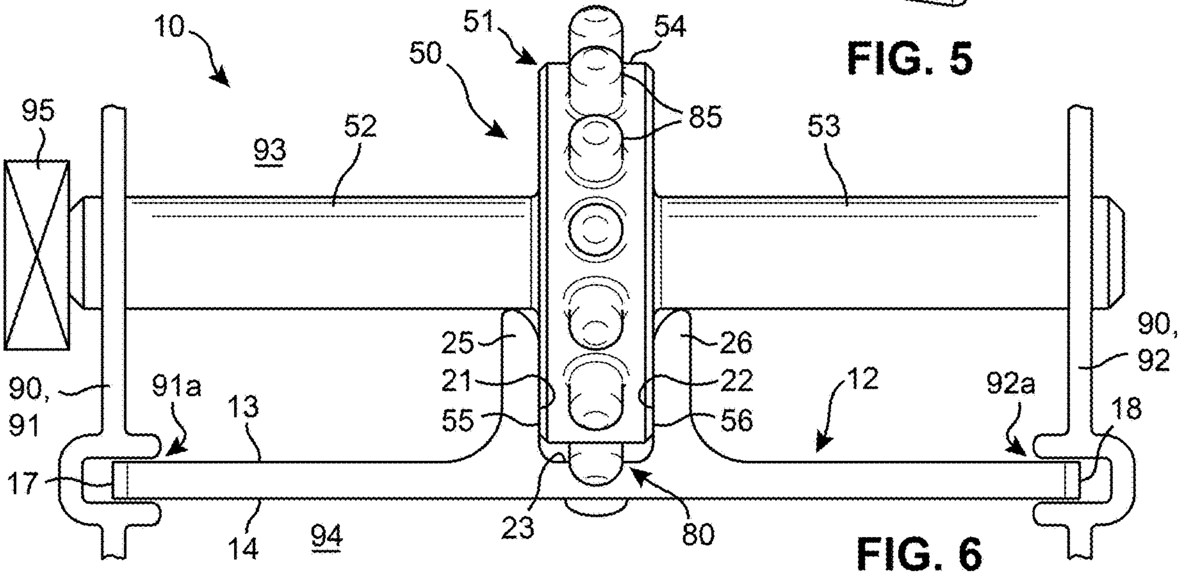
FIG. 6 is a partially schematic and fragmentary front elevational view of the sliding door assembly when installed relative to a housing of an HVAC unit.
Figure 7:
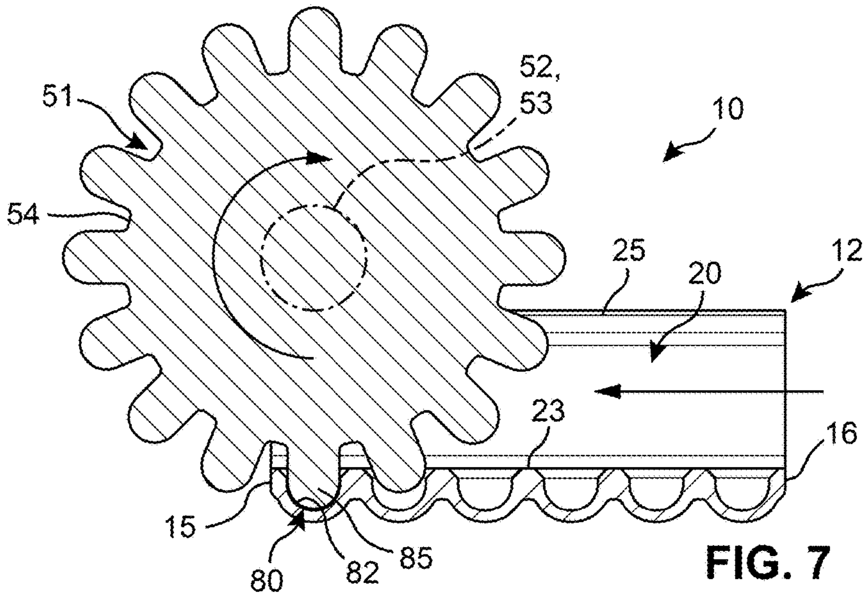
FIG. 7 is an elevational cross-sectional view taken along a plane laterally dividing a channel of the door structure of the sliding door assembly of FIG. 4.

The engagement feature 80 of the sliding door assembly 10 of FIGS. 4-7 comprises the outer circumferential surface 54 of the drive body 51 having a plurality of circumferentially spaced and radially outwardly projecting teeth 85 formed or provided thereon and the channel 20 of the door structure 12 having a corresponding plurality of axially spaced apart teeth receiving openings 82 formed within the base surface 23 of the channel 20, wherein each of the teeth receiving openings 82 is configured to receive a corresponding one of the teeth 85 therein during rotation of the rotary drive structure 50 about the axis of rotation thereof and corresponding movement of the door structure 12 in the axial direction thereof relative to the rotary drive structure 50. The teeth receiving openings 82 are depicted in FIGS. 5-7 as being indentations 82 that are depressed inwardly into the base surface 23 with respect to the thickness direction and towards the second major surface 14, whereby the indentations 82 do not fully penetrate the door structure 12 from the first major surface 13 to the opposing second major surface 14, but instead outwardly deform the door structure 12 such that the second major surface 14 projects outwardly in the thickness direction at positions corresponding to each of the indentations 82.

As shown in FIGS. 5 and 7, each of the indentations 82 may include an axially symmetric shape with a circular perimeter, such as being substantially cylindrical, frustoconical, or hemispherical in shape, or combinations thereof, such as the depicted frustoconical shape at an inlet into each of the indentations 82 and the hemispherical shape forming an inwardly distal surface of each of the indentations 82. Each of the teeth 85 is similarly depicted as having a substantially axially symmetric shape with a circular perimeter, such as including a cylindrical base portion and a hemispherical distal portion at a radially outward end of the base portion. However, it should be readily apparent that the teeth 85 and the corresponding teeth receiving openings/indentations 82 may include alternative complimentary shapes that facilitate the transfer of rotational motion to linear motion while remaining within the scope of the present invention, such as each of the teeth 85 including a substantially pyramidal shape with a rectangular or square perimeter that is configured for reception into a similarly pyramidal shaped indentation 82 having a rectangular or square perimeter, as one additional example.

The indentations 82 are equally spaced apart from one another along the base surface 23 with respect to the axial direction of the door structure 12 while the teeth 85 are equally circumferentially spaced apart from one another along the outer circumferential surface 54 by a distance corresponding to the axial spacing between adjacent ones of the indentations 82, thereby ensuring continual reception of the teeth 85 within the indentations 82 as the door structure 12 continues to move relative to the rotary drive structure 50 during rolling rotation thereof. The indentations 82 are also formed to include a perimeter of each of the indentations 82, which corresponds to an inlet boundary into each of the corresponding indentations 82, disposed along the common plane formed by the base surface 23 into which the indentations 82 are depressed. The teeth 85 and indentations 82 may include tapered or otherwise complimentary shapes that, during rotation of the rotary drive structure 50 relative to the door structure 12, allow for initial reception of each of the teeth 85 into a corresponding one of the indentations 82, the transfer of motion between the rotary drive structure 50 and the door structure 12 where the structures 12, 50 apply forces to each other within a corresponding one of the indentations 82 along the axial direction of the door structure 12, and the removal of each of the respective teeth 85 from the corresponding one of the indentations 82 following the transfer of motion, with respect to either of two rotational directions of the rotary drive structure 50 while engaging the door structure 12 via the engagement feature 80.

The engagement feature 80 of the sliding door assembly 10 of FIGS. 4-7 may accordingly include the drive body 51 of the rotary drive structure 50 forming what may be referred to as a sprocket wheel of a sprocket assembly, and the base surface 23 of the door structure 12 having the array of the axially spaced apart teeth receiving openings/indentations 82 forming what may be referred to as a rack of the sprocket assembly, whereby rotational motion of the sprocket wheel results in rectilinear motion of the rack in a direction tangential to the sprocket wheel.

The sliding door assembly 10 is shown in FIG. 6 in an exemplary installed position within a housing 90 of an HVAC unit having a first lateral wall 91 and an opposing second lateral wall 92 spaced apart from each other by the lateral direction of the door structure 12 and the axial direction of the rotary drive structure 50 to form a flow path 93, 94 therebetween comprising a first portion 93 disposed to a side of the door structure 12 defining the first major surface 13 thereof and a second portion 94 thereof disposed to a side of the door structure 12 defining the second major surface 14 thereof, wherein the portions 93, 94 of the flow path may form upstream/downstream portions depending on a direction of flow of a fluid (air) thereby. As one example, the first portion 93 of the flow path may be an upstream arranged portion receiving air having passed through an evaporator (not shown) of the HVAC unit and the second portion 94 may be a downstream arranged portion configured to be selectively passed for exposing the air to a heater core (not shown) of the HVAC unit, wherein adjustment of the sliding door assembly 10 controls a distribution of the air passing from the first portion 93 to the second portion 94 based on a cross-sectional flow area around the door structure 12 at an inlet to the second portion 94. However, it should be readily apparent to one skilled in the art that the sliding door assembly 10 may be installed into the HVAC unit with respect to substantially any circumstances, including the controlling of air flowing between two or more upstream flow paths and two or more downstream flow paths at any stage in the air conditioning process, while remaining within the scope of the present invention.

The rotary drive structure 50 is shown as received within the flow path with the first and second shaft segments 52, 53 each rotatably coupled or otherwise supported to a corresponding one of the lateral walls 91, 92 to establish a fixed axis of rotation of the rotary drive structure 50 relative to the housing 90. In the illustrated configuration, each of the shaft segments 52, 53 extends through an opening through the corresponding one of the lateral walls 91, 92, but any rotatable connection of rotary drive structure 50 to the housing 90 may be utilized while remaining within the scope of the present invention. The first shaft segment 52 is mechanically engaged with corresponding structure of the rotary drive mechanism 95 to allow for the selective rotation of the rotary drive structure 50 via actuation of the rotary drive mechanism 95. Any form of mechanical interface may be utilized in transferring the rotational motion of the rotary drive mechanism 95 to the first shaft segment 52, as desired.

The door structure 12 is shown as being constrained from motion in the thickness direction of the door structure 12, including restraining rotation of the door structure 12 about a laterally extending axis displacing the door structure 12 from the illustrated configuration, via the use of a first guide feature 91*a* of the first lateral wall 91 and a second guide feature 92*a* of the second lateral wall 92. Each of the guide features 91*a*, 92*a* extends laterally inwardly beyond a corresponding one of the lateral side surfaces 17, 18 such that a first portion of each of the guide features 91*a*, 92*a* faces towards the first major surface 13 and stops motion of the door structure 12 in the thickness direction towards the first portion 93 of the flow path and a second portion of each of the guide features 91*a*, 92*a* faces towards the second major surface 14 and stops motion of the door structure 12 in the thickness direction towards the second portion 94 of the flow path. The guide features 91*a*, 92*a* may be utilized in maintaining the door structure 12 on the illustrated plane for ensuring motion of the door structure 12 exclusively in the axial direction thereof during adjustment of the sliding door assembly 10.

The use of the channel 20 in restraining lateral movement and/or rotation of the door structure 12 relative to the fixed axis of rotation of the drive body 51 results in the ability to avoid frictional contact between the lateral side surfaces 17, 18 of the door structure 12 and the corresponding guide features 91*a*, 92*a* that may be utilized in constraining motion of the door structure 12 to the desired plane, thereby preventing an incidence of a skewing of the door structure 12 that could cause undesired frictional contact and potentially seizing of the door structure 12 when opposing corners of the door structure 12 could otherwise drag along the corresponding surfaces of the guide features 91*a*, 92*a*. Instead, the door structure 12 may be constrained such that the only sliding contact occurring between the door structure 12 and any such guide features 91*a*, 92*a* occurs in parallel to the intended direction of sliding of the door structure 12 relative to the housing 90, in parallel to the primary direction of force occurring between the teeth 85 of the rotary drive structure 50 and the teeth receiving openings 82 of the door structure 12, and along surfaces of the door structure 12 and the guide features 91*a*, 92*a* intended for potential sliding contact in the manner described, thereby resulting in the door structure 12 not being at risk of becoming frictionally constrained or otherwise misaligned or disoriented relative to the guide features 91*a*, 92*a* such that a seizure of the door structure 12 or the production of an undesirable noise results from the guidance of the door structure 12 by the guide features 91*a*, 92*a*. The sliding door assembly 10 of the present invention accordingly overcomes the shortcomings of the prior art as described with reference to FIGS. 1-3 herein.

The channel 20 of the door structure 12 may be centrally located relative to the lateral dimension thereof to ensure that the axial force applied between the teeth 85 and the teeth receiving openings 82 for translating the door structure 12 in the axial direction thereof is applied to the door structure 12 at a substantially equal lateral distance as any other forces that may be applied substantially equally to opposing lateral portions of the door structure 12 during operation thereof, such as any frictional forces that may result from the sliding of the door structure 12 relative to each of the guide features 91*a*, 92*a*. That is, the equal lateral spacing of the frictional forces to either lateral side of the interface between the teeth 85 and opening 82 results in a balancing of the moments or torques that occur about an axis extending in the thickness direction of the door structure 12 as the frictional forces resist motion of the door structure 12 in the selected axial direction, which in turn prevents the door structure 12 from attempting to rotate relative to the guidance of the channel 20 about the described axis in a manner that could increase the frictional forces present between the faces 55, 56 of the drive body 51 and the lateral surfaces 21, 22 of the channel 20 as a result of the rolling/orbiting motion of the faces 55, 56 relative to the lateral surfaces 21, 22 during traversal of the channel 20 by the drive body 51. The central location of the channel 20 also results in any forces present between the rotary drive structure 50 and the door structure 12 with respect to the thickness direction similarly being balanced for cancelling any resulting moments or torques that may occur about an axis extending in the axial direction of the door structure 12 as a result of substantially equal static or dynamic pressures being applied to the door structure 12 to the lateral sides of the drive body 51, which similarly prevents an urging of the door structure 12 to a configuration increasing frictional contact between the drive body 51 and the channel 20. The channel 20 may also be formed in the door structure 12 along a portion thereof including the center of mass of the door structure 12 in order to ensure that any forces resulting from the weight of the door structure 12 are distributed equally to each lateral side of the drive body 51 to once again prevent an incidence of a moment or torque in a given direction causing undesirable urging of the door structure 12 towards a misaligned and friction-increasing configuration. Lastly, the central disposition of the drive body 51 aids in ensuring that flow conditions are similar for any air passing over the sliding door assembly 10 to either lateral side of the drive body 51, and especially in circumstances wherein the flow path 93, 94 is subsequently divided laterally within the corresponding housing 90 for delivering the air to different regions of the passenger compartment, such as where the HVAC unit delivers multi-zone control of air within the passenger compartment. That is, any flow over the drive body 51 may be divided equally to each lateral side thereof such that any disturbance to the air flow by the drive body 51 is not experienced undesirably with respect to one of two or more laterally disposed flow paths.

FIG. 7 shows one exemplary adjustment of the sliding door assembly 10 wherein the rotary drive structure 50 is rotated in a first rotational direction (clockwise from the perspective of FIG. 7) to cause a corresponding movement of the door structure 12 in a first axial direction towards the first axial end 15 thereof as each of the teeth 85 subsequently enter into and then forceably engage a corresponding surface of the associated one of the teeth receiving openings/indentations 82 during a rolling movement of the drive body 51 within the channel 20. The shaft segments 52, 53 may also rollably engage the distal surfaces of the wall segments 25, 26 defining the channel 20 to establish the correct depth of the teeth 85 when entering the indentations 82 during rotation of the rotary drive structure 50. Although not pictured, it should be understood that rotation of the rotary drive structure 50 in an opposing second rotational direction (counter-clockwise) causes a movement of the door structure 12 in an opposing second axial direction towards the second axial end 16 thereof via the same interactions occurring between the teeth 85 and the indentations 82.

As mentioned earlier, when the teeth receiving openings 82 are provided as the indentations 82 that do not penetrate the thickness of the door structure 12, the indentations 82 may be formed by plastically deforming the door structure 12 along the base surface 23 of the channel 20 via the application of appropriate compressive force to the base surface 23 in a direction towards the second major surface 14 with respect to the thickness direction. Such a deformation force may be applied by a corresponding tool (not shown) having a shape complimentary to the resulting indentations 82. The formation of the indentations 82 via plastic deformation of the door structure 12 with respect to the thickness direction thereof may occur via a stamping process, an embossing process, or the like, as desired.

Figure 8:
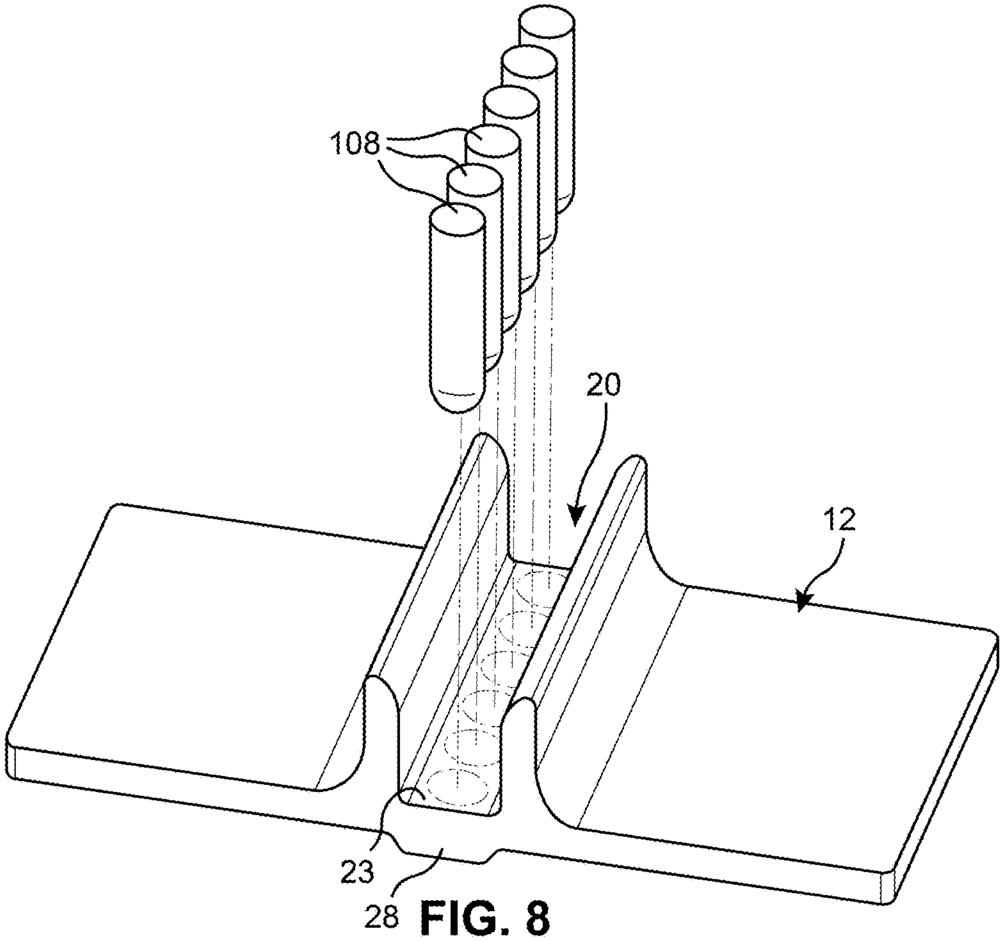
FIG. 8 is a perspective view showing a plurality of cutting tools approaching a door structure in isolation for forming indentations therein.
Figure 9:
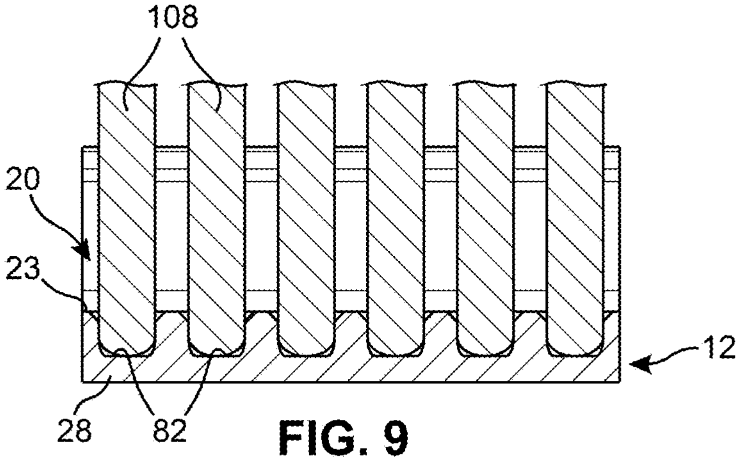
FIG. 9 is an elevational cross-sectional view taken along a plane laterally dividing a channel of the door structure of FIG. 8.

Referring now to FIGS. 8 and 9, the door structure 12 may alternatively include the formation of the indentations 82 via an appropriate machining (cutting) process whereby material is removed from the extruded or pultruded door structure 12 via an appropriate cutting tool 108. In the illustrated example, each of the cutting tools 108 is representative of a rotationally/axially symmetric rotary cutting tool, such as a drill, that is advanced in the thickness direction a suitable distance into the base surface 23 for forming the indentations 82 with a desired shape and depth. The use of the cutting tools 108 to remove material may result in the need to extrude or pultrude the door structure 12 to include a thickened portion 28 projecting from the second major surface 14 with respect to the thickness direction to accommodate the depth at which the cutting tool 108 must be advanced to form the indentations 82 without penetrating the door structure 12.

Figure 10:
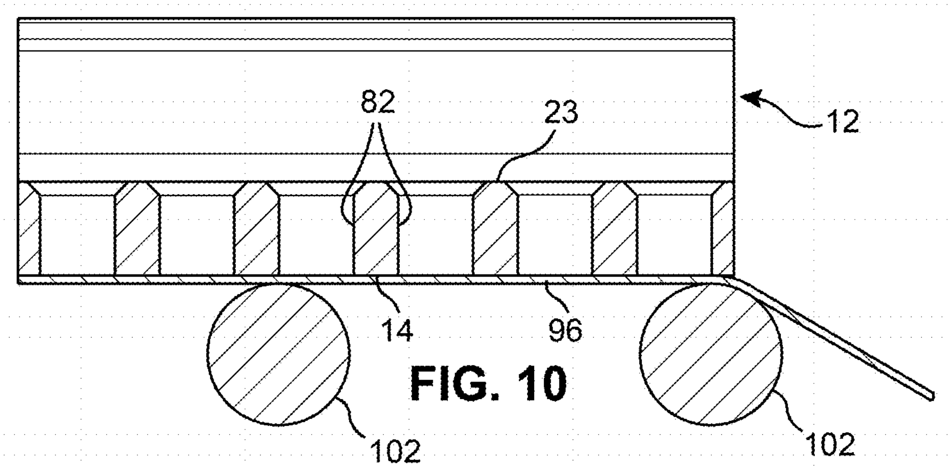
FIG. 10 is a partially schematic elevational cross-sectional view taken along a plane laterally dividing a channel of a door structure for showing a method of covering through-holes extending through the door structure.

As another example, the teeth receiving openings 82 need not be formed as indentations 82 with resulting projections resulting in the opposing second major surface 14, but may instead be formed as through-holes 82 as depicted in FIG. 10. That is, the through-holes 82 and the teeth 85 may be suitably shaped and spaced to allow for the teeth 85 to enter the through-holes 82 and engage the defining surfaces thereof for driving the movement of the door structure 12 in the same manner as shown and described with regards to the indentations 82 of FIG. 7. The through-holes 82 may be formed using the previously described machining process with a corresponding tool 108 penetrating the entirety of the thickness of the door structure 12, as one example. Another relatively fast and efficient process for forming the through-holes 82 is to punch the through-holes 82 from the door structure 12 via an appropriate punching process applied to the base surface 23.

One concern arising from the use of the through-holes 82 is that air may leak through any of the through-holes 82 that are not instantaneously engaged with one of the teeth 85 in a manner plugging the corresponding through-hole 82, which not only degrades performance of the door, but also can cause a whistling sound to occur. An additional manufacturing step may accordingly include the use of one or more rollers 102 to apply a cover 96 to the second major surface 14 of the door structure 12 to cover each of the through-holes 82 and prevent air flow through the through-holes 82 between the first and second major surfaces 13, 14. The cover 96 may include an adhesive-coated surface that faces towards and adhesively engages the second major surface 14 opposite the base surface 23 of the channel 20 as the rollers 102 apply the cover 96 thereto. The cover 96 may be provided as an elongate strip of material capable of being rolled onto the second major surface 14 with respect to the axial direction of the door structure 12. The cover 96 may be formed from a rubber, plastic, or other material having favorable frictional properties and flexibility for application.

The door structure 12 may favorably be produced in a continuous process wherein the teeth receiving openings 82, whether formed as indentations 82 or through-holes 82, are formed with respect to a strip or length of the extruded or pultruded door material having the disclosed cross-sectional shape following emergence of the door material from the corresponding extrusion or pultrusion die and prior to separation of the strip or length into individual ones of the door structures 12 corresponding to axially extending portions of the strip or length. Immediately following the formation of the teeth receiving openings 82 therein, the strip or length of the material may be separated into the individual door structures 12 via a laterally extending cut applied to the strip or length of the extruded/pultruded door material. The continuous process may include the continual production of the extruded/pultruded cross-section of the door material such that the strip or length of resulting door material is moving at a constant speed with respect to the axial direction of the door structures 12 while the formation of the teeth receiving openings 82 and/or the cutting of the individual ones of the door structures 12 may be performed by tooling that moves in unison with the corresponding segment of the strip or length of door material when approaching the door structure 12 and thus performing the corresponding cutting or deformation thereof.

Figure 11:
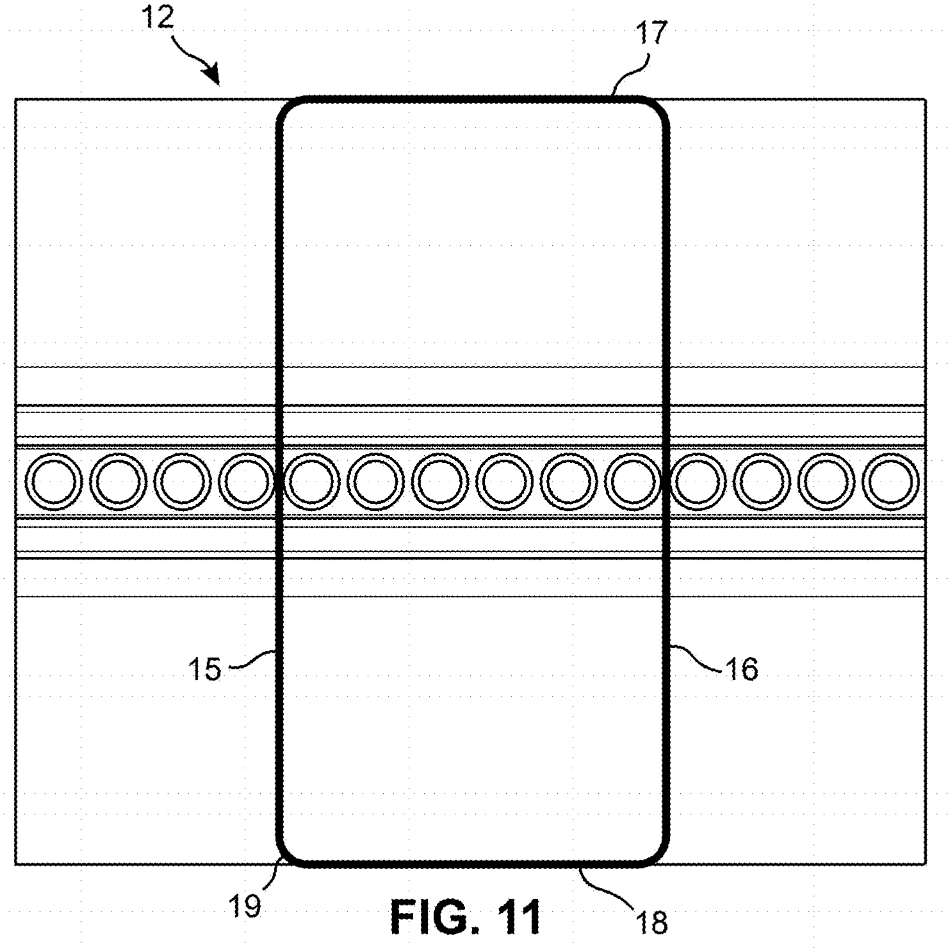
FIG. 11 is a top plan view showing a perimeter of a shape removed from an extruded or pultruded strip of material to form a door structure therefrom.

FIG. 11 illustrates one example of the removal of an individual one of the door structures 12 from such a strip or length of extruded/pultruded door material including the punching of the door structure 12 from the strip or length to include the described perimeter shape including the first and second axial end surfaces 15, 16 and the first and second lateral side surfaces 17, 18. The lateral side surfaces 17, 18 may be formed by the outermost portions of the extruded/pultruded cross-sectional shape, hence the punch need not cut these surfaces 17, 18. The punching process may primarily include the punching of the laterally extending cuts forming the axial end surfaces 15, 16 at positions between adjacent ones of the teeth receiving openings 82, wherein one cut may form the opposing end surfaces 15, 16 of subsequent ones of the door structures 12. The punching process may also include the formation of the previously described convex arcuate surfaces 19 at each corner of the resulting door structure 12 as shown in FIG. 11, although the inclusion of such features is optional. It may be beneficial to perform the punching operation by approaching the door structure 12 towards the second major surface 14 thereof, as opposed to towards the first major surface 13 thereof, in order to prevent initial contact with and potential degradation of the condition of the wall segments 25, 26 defining the channel 20 upon interaction with a cutting surface of the punch, thereby ensuring that the channel 20 is properly formed and not subject to misalignment with the drive body 51.

Figure 12:
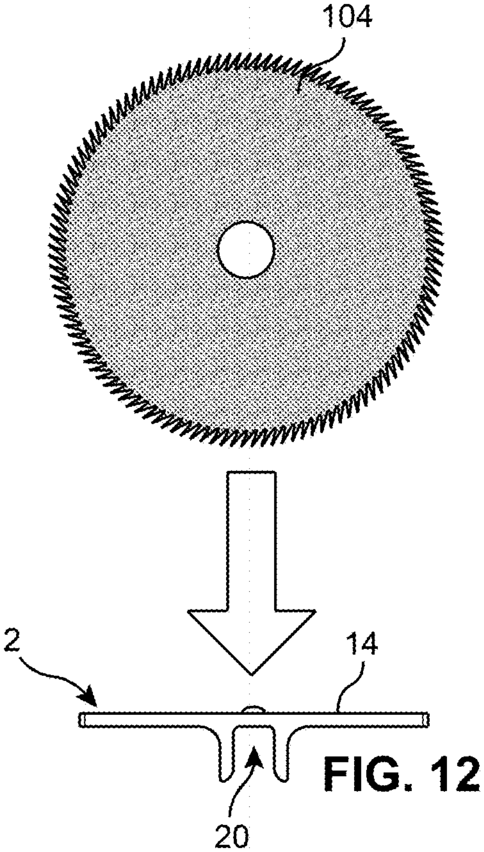
FIGS. 12-14 are partially schematic front elevational views showing exemplary angles of approach of a cutting tool when shearing a door structure according to the present invention.
Figure 13:
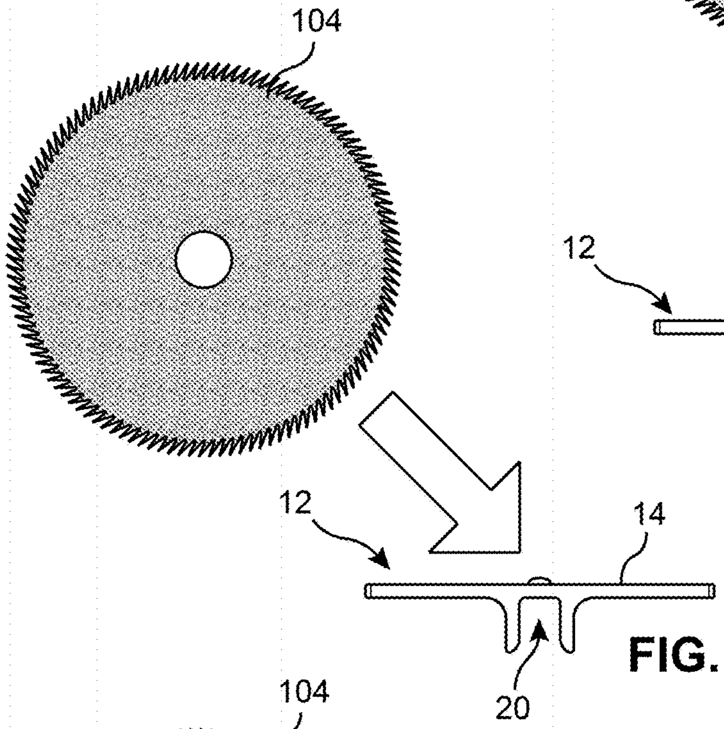
Figure 14:
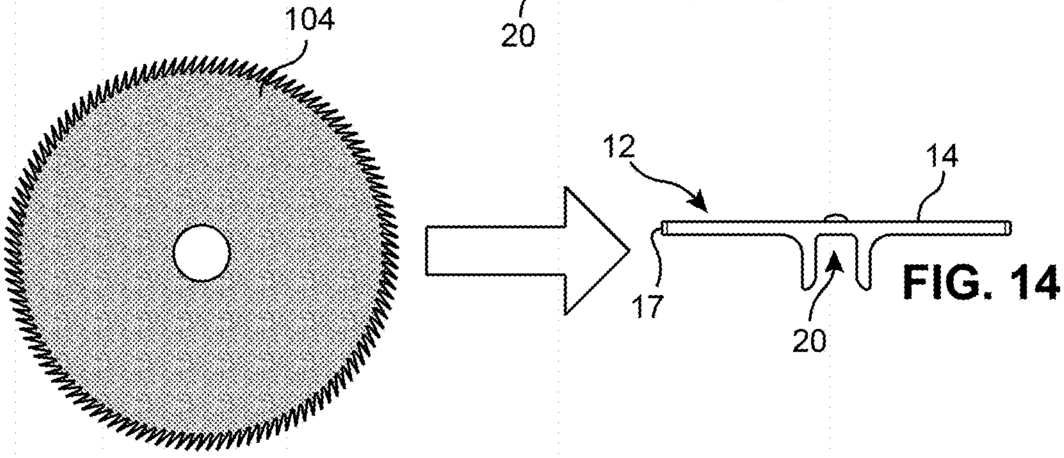

FIGS. 12-14 illustrate various different approach angles that may be utilized in shearing the door structure 12 from the strip or length of the door material when a saw 104 or similar cutting or shearing tool is utilized in approaching the door structure 12. Once again, it may be preferable to avoid approaching the door structure 12 from the first major surface 13 and towards the opening of the channel 20, hence FIG. 12 shows the saw 104 as approaching towards the second major surface 14 exclusively in the thickness direction, FIG. 13 shows the saw 104 as approaching towards the second major surface 14 at an incline with respect to each of the thickness direction and the lateral direction, and FIG. 14 shows the saw 104 as approaching exclusively from the lateral direction for first encountering one of the lateral side surfaces 17, 18 of the door structure 12.

Alternative methods of separating a length of the strip of door material therefrom for forming an individual one of the door structures 12 include use of a waterjet cutting process, use of a laser cutting process, or use of an air jet cutting process, as non-limiting additional examples.

Where the described adhesive-back cover 96 is utilized as shown and described with respect to FIG. 10, such a cover 96 may also be incorporated into the continuous process by applying the cover 96 following the formation of the through-holes 82 and prior to the separation of the strip or length of material having the cover 96 applied thereto into the individual door structures 12 via laterally extending cuts or shears. The cutting of the door material into the individual door structures 12 may accordingly include penetration and shearing of the cover 96 during the separation process.

Although the described continuous process is preferable, it should be readily understood that the door structures 12 may be formed in an alternative order to that described without negatively impacting the beneficial features of the sliding door assembly 10 as shown and described herein, including removing the individual door structures 12 from the extruded/pultruded length or strip of material prior to the formation of any additional surface features such as the teeth receiving openings 82 therein, or prior to the addition of the cover 96 thereto. The door structure 12 may also be produced to include the disclosed shape and configuration absent the formation thereof via a corresponding extrusion/pultrusion process while still maintaining the beneficial features of the resulting structure associated with the disclosed sliding door assembly 10, such as alternatively forming the door structure 12 via an injection molding process or the like, although the efficiency and the precision of the formation of the door structure 12 may be impacted by the method of formation thereof in accordance with the teachings of the present disclosure.

The completed and separated door structure 12 may thus be operatively engaged with a corresponding rotary drive structure 50 in the illustrated and described manner for interaction between the teeth 85 and the teeth receiving openings 82, which may occur during installation of the door structure 12 relative to the rotary drive structure 50 within a corresponding housing 90, such as shown and described with reference to FIG. 6. The sliding door assembly 10 is then fully assembled and ready for adjustment to a plurality of different configurations in accordance with a position of the door structure 12 along the axial direction of movement thereof.

Figure 15:
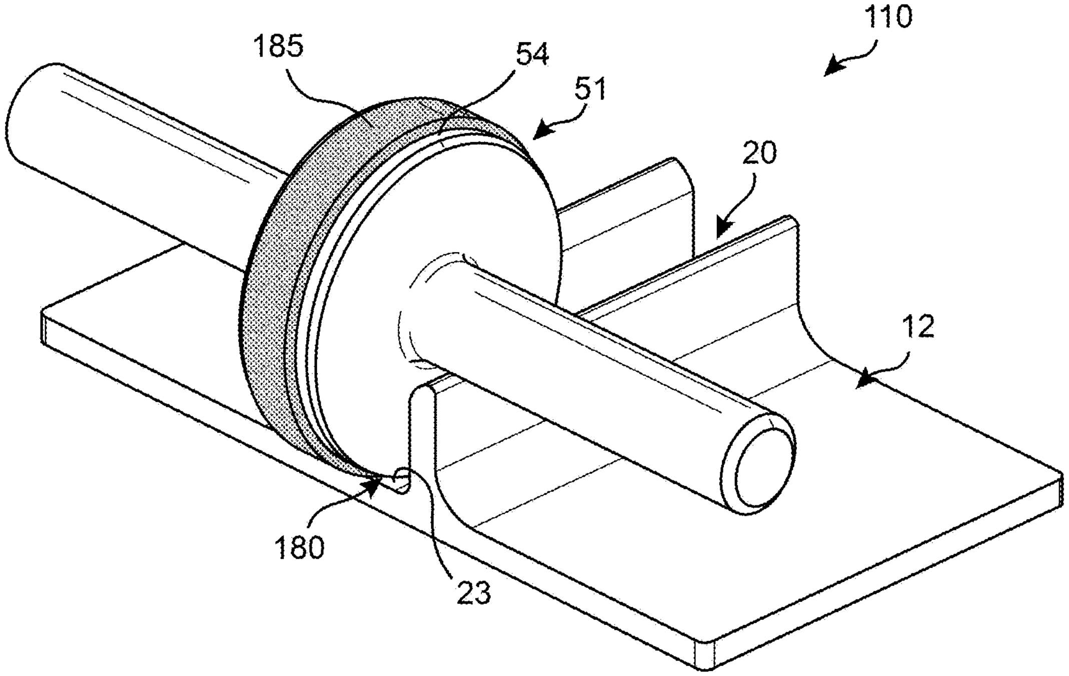
FIG. 15 is a perspective view showing a sliding door assembly according to another embodiment of the present invention.
Figure 16:
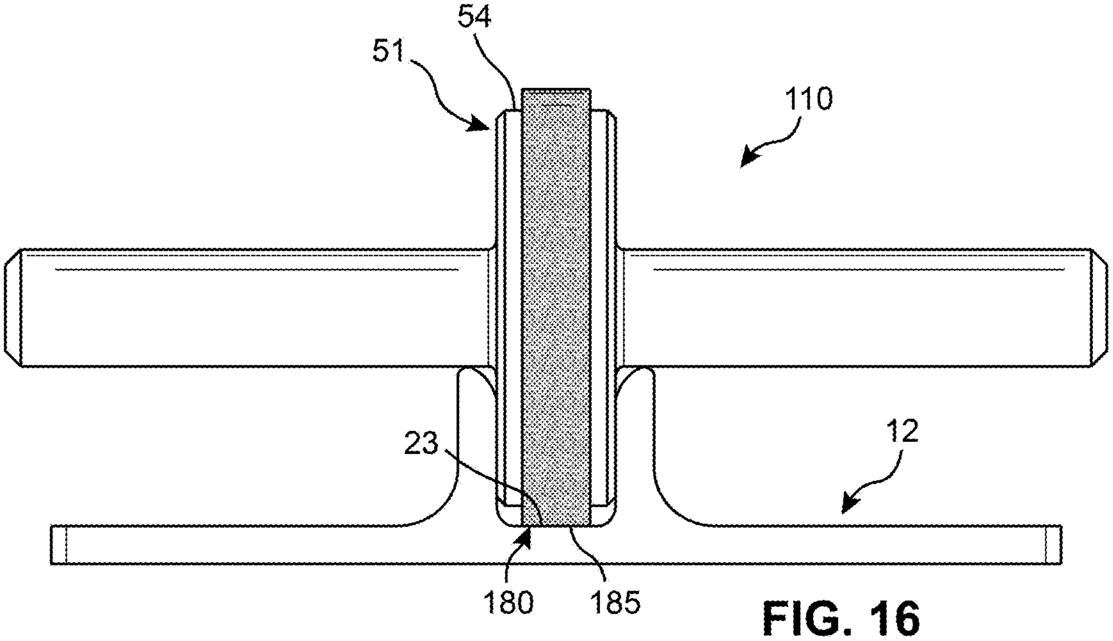
FIG. 16 is a front elevational view of the sliding door assembly of FIG. 15.

Referring now to FIGS. 15 and 16, a sliding door assembly 110 according to another embodiment of the present invention is disclosed. The sliding door assembly 110 includes substantially the same structure as the sliding door assembly 10, but differs by the inclusion of an alternative configuration of an engagement feature 180 of the sliding door assembly 110 configured to transfer the rotational motion of the rotary drive structure 50 to the rectilinear translation of the door structure 12. It should, however, be assumed that the sliding door assembly 110 otherwise operates in the same manner as described with reference to the sliding door assembly 10 and also includes the same relationships present between the components thereof that do not directly relate to the operation of the engagement feature 80 and the interactions occurring between the teeth 85 and the teeth receiving openings 82, unless noted otherwise.

The drive body 51 of the rotary drive structure 50 is produced in the absence of the radially outwardly projecting teeth 85 and is instead produced to include an engagement element 185 extending annularly and circumferentially around the outer circumferential surface 54 of the drive body 51. The engagement element 185 may be a belt or strip of material looped around the cylindrical outer circumferential surface 54 to result in the engagement element 185 having a cylindrical shape with an outer diameter greater than that of the outer circumferential surface 54 for positioning the engagement element 185 as the radially outermost surface of the drive body 51. The material forming the engagement element 185 may be a polymeric material having a relatively high co-efficient of friction in comparison to the material forming the outer circumferential surface 54, such as the use of an elastomeric material (rubber).

As shown in FIG. 16, the base surface 23 of the channel 20 may be formed to be planar and arranged parallel to the axial and lateral directions while also being devoid of the teeth receiving openings 82 for cooperating with the teeth 85. The sliding door assembly 110 accordingly simplifies the production of the door structure 12 as the step resulting in the formation of the openings 82 may be omitted. The planar base surface 23 acts as a track along which the engagement element 185 may roll during rotation of the rotary drive structure 50 about the axis of rotation thereof when within the channel 20, wherein frictional forces present between the base surface 23 and the engagement element 185 cause the door structure 12 to move in the axial direction thereof relative to the fixed axis of rotation of the rotary drive structure 50, which is tangential to the contact between the cylindrical engagement element 185 and the base surface 23.

The door structure 12 may be installed within a corresponding housing 90 with the door structure 12 slidably received within guide features 91*a*, 92*a* such as those shown in FIG. 6 to restrict motion of the door structure 12 to the desired plane. The dimension of one or more of the distance of projection of the wall elements 25, 26 in the thickness direction away from the base surface 23, the outer diameter of the shaft elements 52, 53, the outer diameter of the outer circumferential surface 54, and/or the thickness of the engagement element 185 may be varied to result in the engagement element 185 being slightly compressed in the thickness direction when the sliding door assembly 110 is installed within the housing 90 to promote suitable frictional forces being present between the engagement element 185 and the track formed by the base surface 23 in the absence of the toothed interaction of the engagement feature 80. The engagement feature 180 accordingly includes the drive body 51 taking on the form of a wheel with the engagement element 185 forming a tire thereof, wherein the tire linearly translates the door structure 12 during a rolling of the tire within the channel 20 and along the track formed by the base surface 23, wherein traction present between the tire and the track drives the transfer of motion therebetween.

Figure 17:
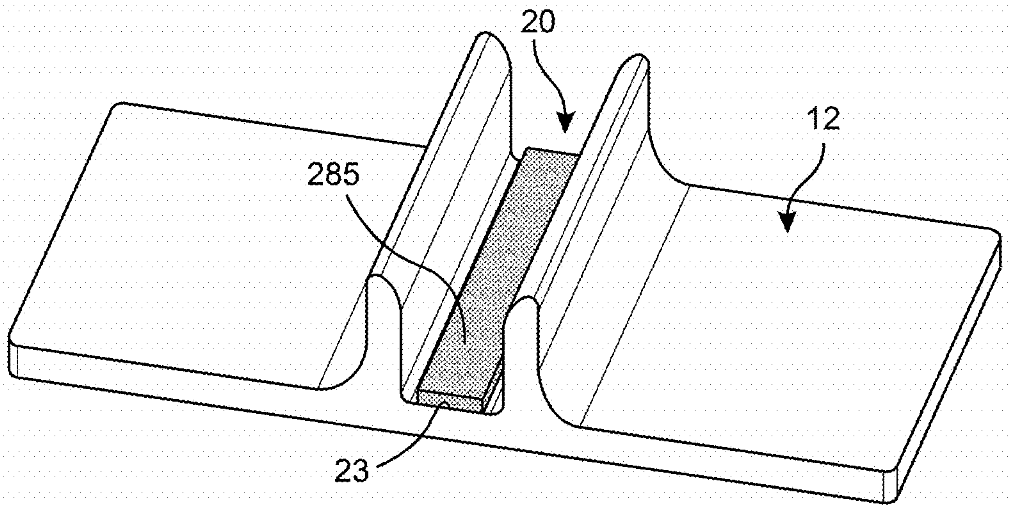
FIG. 17 is a perspective view showing a door structure having an engagement element disposed along a channel thereof.
Figure 18:
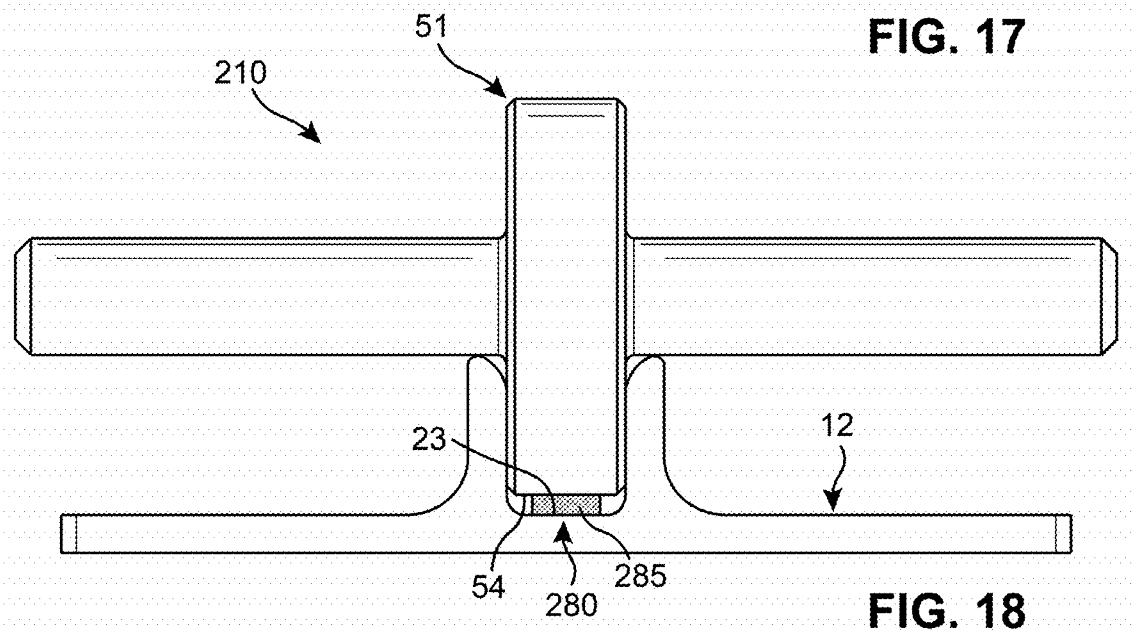
FIG. 18 is a perspective view of a sliding door assembly according to another embodiment of the present invention and including the door structure of FIG. 17.

FIGS. 17 and 18 illustrate a sliding door assembly 210 according to another embodiment of the present invention. The sliding door assembly 210 is substantially identical in many respects to the sliding door assembly 110 except that an engagement feature 280 of the sliding door assembly 210 includes a reversal of components relative to the engagement feature 180, wherein an engagement element 285 is provided as a rectangular cuboid strip of material extending axially along the base surface 23 for engagement with the outer circumferential surface 54 of the drive body 51 during rotation thereof. The elongate strip forming the engagement element 285 may be formed from the same materials as described with reference to the engagement element 185 formed as the annular tire around the drive body 51, whereby such a material includes a relatively high coefficient of friction for improving frictional contact occurring between the outer circumferential surface 54 of the drive body 50 and the engagement element 285. The engagement element 285 may be applied to the base surface 23 via a suitable adhesive formed along a back surface of the engagement element 285, as desired. The sliding door assembly 210 operates in the same fashion as the sliding door assembly 110, wherein rotation of the drive body 51 within the channel 20 causes a rolling of the outer circumferential surface 54 along an axially and laterally extending plane formed by an exposed surface of the engagement element 185 for transferring rotational motion of the drive body 51 to linear motion of the door structure 12. An installed configuration of the sliding door assembly 210 may include the drive body 51 applying a compressive force to the engagement element 285 to promote the increased frictional forces therebetween.

Figure 19:
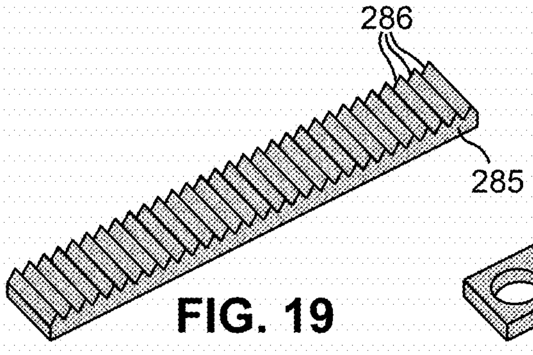
FIGS. 19 and 20 are perspective views of engagement elements having traction-increasing surface features formed therein.
Figure 20:
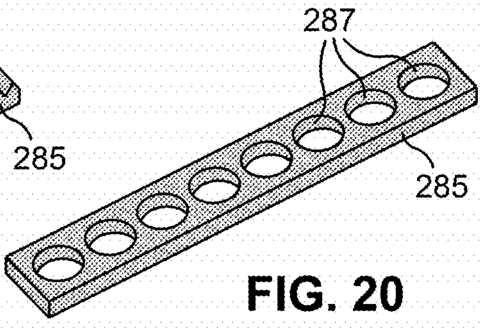

The engagement element 285 provided as the strip of material along the base surface 23 may be produced to include additional friction or traction increasing features to ensure a non-slip rolling of the rotary body 51 relative to the engagement element 285. FIG. 19 illustrates one example wherein an exposed outer surface of the engagement element 285 along which the drive body 51 rolls includes a corrugated profile including a plurality of teeth 286 projecting outwardly therefrom in a saw-tooth configuration, whereas FIG. 20 illustrates another example wherein the exposed outer surface of the engagement element 285 includes inwardly indented sockets 287 formed therein. Each of the discloses features is provided to aid in producing axially extending forces between the outer circumferential surface 54 and the engagement element 285 via interaction with features of the engagement element 285 extending in the thickness direction of the door structure 12.

Figure 21:
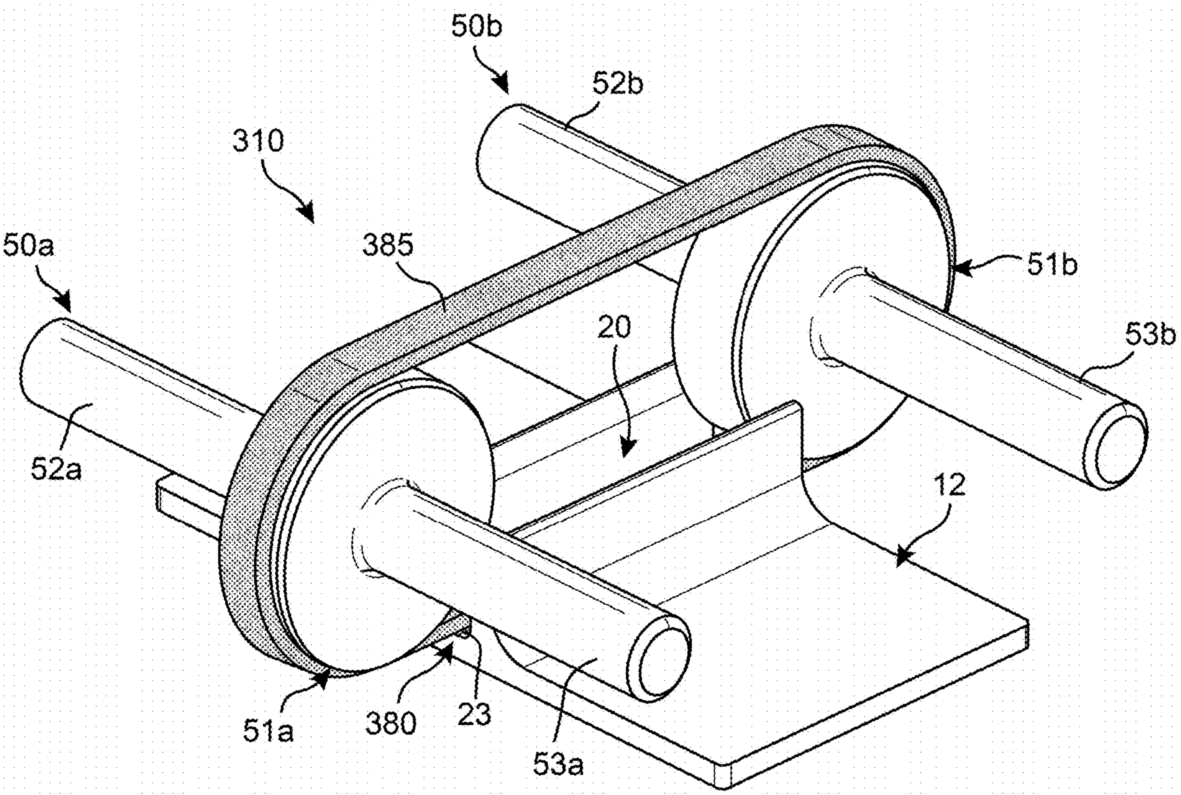
FIG. 21 is a perspective view of a sliding door assembly having a pair of rotary drive structures and a looped engagement element according to another embodiment of the present invention.

Referring now to FIG. 21, a sliding door assembly 310 according to another embodiment of the present invention is disclosed. The sliding door assembly 310 operates via use of the same principles as the sliding door assembly 110, but includes the use of each of a first rotary drive structure 50*a* and a second rotary drive structure 50*b* spaced apart from each other with respect to the axial direction of the door structure 12, each of which includes respective drive bodies 51*a*, 51*b*, first shaft segments 52*a*, 52*b*, and second shaft segments 53*a*, 53*b* as described previously. The rotary drive structures 50*a*, 50*b* may be spaced axially such that the channel 20 of the door structure 12 is always receiving at least one of the drive bodies 51*a*, 51*b* therein during movement of the door structure 12 relative to the drive bodies 51*a*, 51*b* such that lateral movement and rotation of the door structure 12 is prevented along all possible positions thereof.

An engagement feature 380 of the sliding door assembly 310 is formed by an engagement element 385 provided as a looped belt that is received partially around the outer circumferential surface 54 of both of the drive bodies 51*a*, 51*b* such that a driving of one of the rotary drive structures 50*a*, 50*b* to rotate about the respective axis of rotation thereof causes the engagement element 385 to orbit around the looped configuration provided by the cylindrical drive bodies 51*a*, 51*b* while also driving the non-driven one of the rotary drive structures 50*a*, 50*b*. The disclosed assembly of the drive bodies 51*a*, 51*b* and the engagement element 385 may thus be said to resemble a caterpillar configuration or a tank-track configuration. A portion of the looped engagement element 385 is also in frictional contact with the planar base surface 23 of the channel 20 such that orbiting motion of the engagement element 385 in either of two orbiting directions causes a resulting movement of the door structure 12 in the axial direction thereof. The engagement element 385 may be tensioned into contact with the base surface 23 to ensure suitable frictional engagement therebetween. The engagement element 385 may be formed from the same materials described as suitable in forming the engagement elements 185, 285, as desired.

Figure 22:
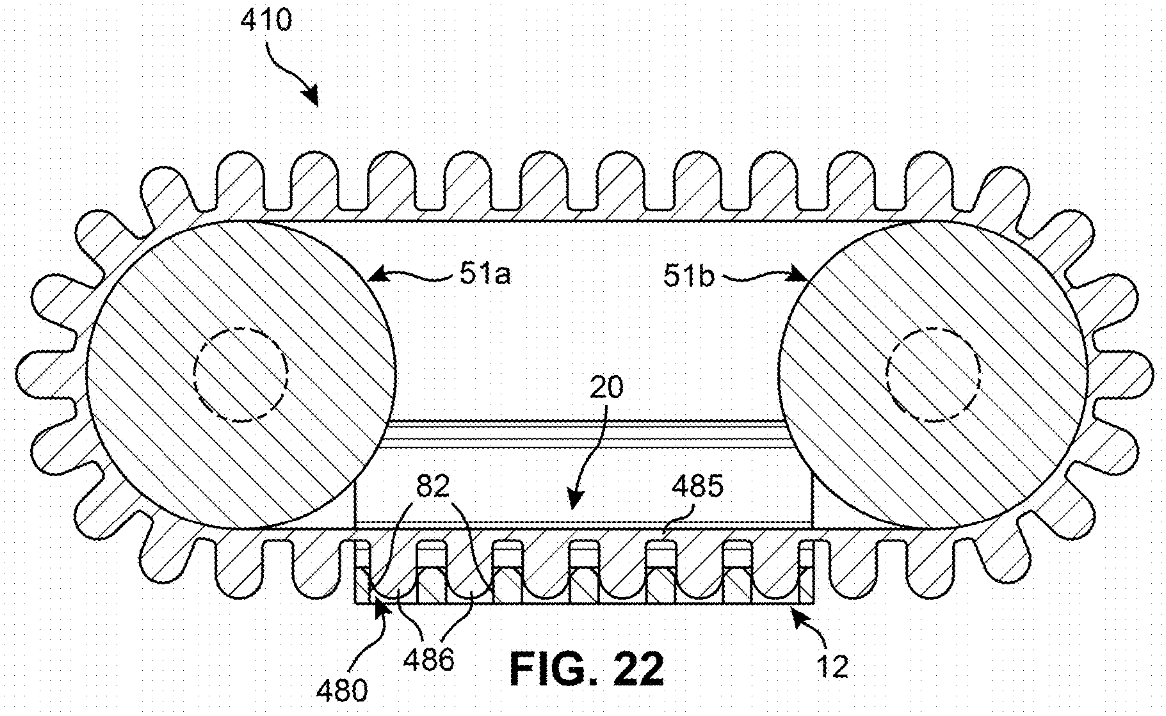
FIG. 22 is an elevational cross-sectional view taken along a plane laterally dividing a channel of a door structure of a sliding door assembly having a toothed and looped engagement element according to another embodiment of the present invention.

FIG. 22 illustrates a sliding door assembly 410 according to yet another embodiment of the present invention, wherein the sliding door assembly 410 includes a substantially similar caterpillar/tank track configuration as that disclosed with reference to the sliding door assembly 310, but instead utilizes an engagement feature 480 more similar to the engagement feature 80 disclosed with regards to the sliding door assembly 10. The assembly 410 includes axially spaced apart first and second drive bodies 51*a*, 51*b* having a looped engagement element 485 extending therearound in drive-belt fashion as disclosed in FIG. 21, but the engagement element 485 differs by the inclusion of outwardly extending teeth 486 projecting from an outer surface of the engagement element 485 arranged to face towards the door structure 12 when passing thereover during an orbiting of the engagement element 485. The door structure 12 is provided to include the teeth receiving openings 82 therein in the same fashion as described hereinabove, which may include the formation of indentations 82 or through-holes 82, as desired. The teeth 486 are received within and/or exit the teeth receiving openings 82 whenever the teeth receiving openings 82 pass axially beyond the axis of rotation of the corresponding one of the drive bodies 51*a*, 51*b* during transport of the door structure 12 in the axial direction thereof, and the teeth 486 may fill all of the openings 82 when transporting the door structure 12 intermediate the axes of rotation of the drive bodies 51*a*, 51*b*, such as is depicted in FIG. 22. The sliding door assembly 410 may beneficially include the advantage of being able to produce the door structure 12 via the use of the described continuous process utilizing the punching of the through-openings 82 therefrom because the teeth 486 of the engagement element 485 may be configured to substantially plug each of the through-openings 82 upon reception therein, thereby preventing the undesired whistling or leakage of air therethrough.

Figure 23:
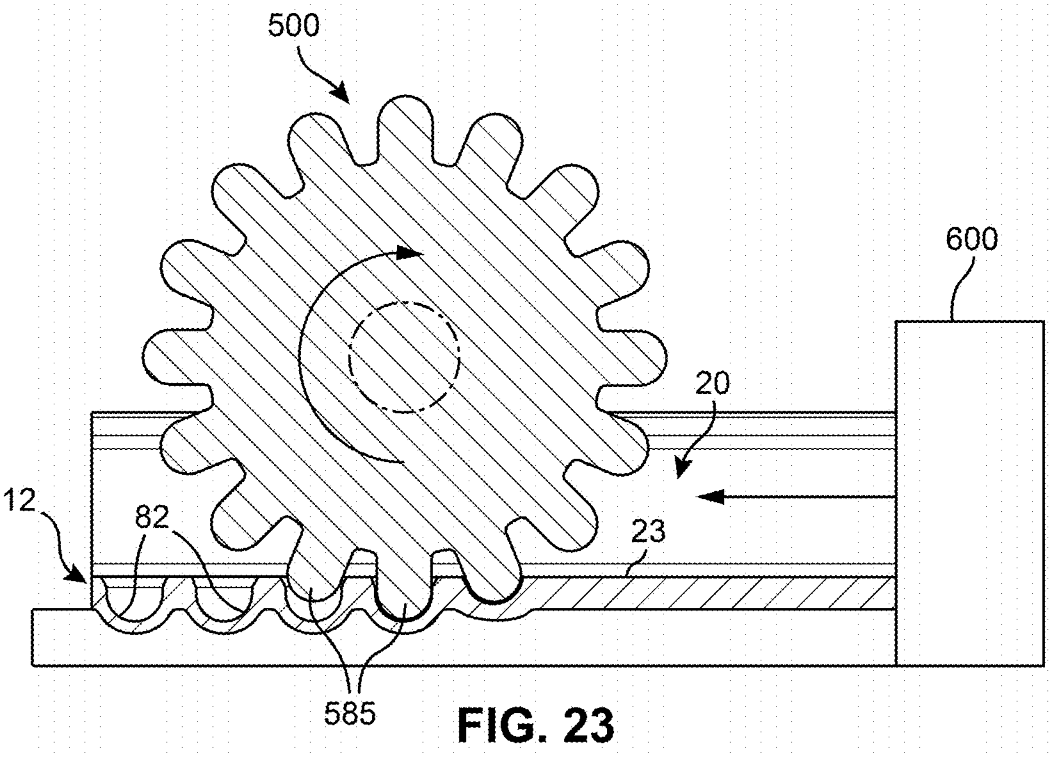
FIG. 23 is an elevational cross-sectional view showing a pulling wheel as may be utilized in a simultaneous pultrusion and indentation forming process.

FIG. 23 illustrates one beneficial method of manufacturing the door structure 12 via a pultrusion process when manufacturing the door structure 12 to include the teeth receiving openings 82 in the form of the indentations 82 plastically deformed into the base surface 23. A strip or length of the door material having the constant cross-section is pulled from a die 600 via a pulling wheel 500 having the same configuration as the drive body 51 having the teeth 85 of the sliding door assembly of FIGS. 4-7, wherein the pulling wheel 500 pulls the door material in the axial direction thereof by continuously plastically deforming the base surface 23 of the door material via radially outwardly projecting teeth 585 in a manner resulting in the formation of the indentations 82 as the pulling wheel 500 is rotated about a stationary axis of rotation thereof. The pulling wheel 500 having the same configuration as the drive body 51 ensures that the resulting door structure 12 will include the desired configuration of the indentations 82 for properly interacting with the teeth 85 of the drive body 51 because the pulling of the door material by the pulling wheel 500 essentially confirms desirable formation of the array of the indentations 82 as otherwise the pulling wheel 500 would fail in pulling the door material in the desired manner. That is, operation of the pulling wheel 500 in an acceptable fashion should result in the production of operable door structures 12 as the manufacturing process utilized in forming the indentations 82 will be interrupted or will otherwise show evidence of improper formation upon such issues arising during the manufacturing process due to the similar methods of axially transporting the door structure or door material in either circumstance. As such, a proper phasing/pitch of the indentations 82 or a proper depth of the indentations 82 is ensured during formation of the door structure 12. Therefore, a "go/no-go" gauge can be readily used to ensure that the forming pulling wheel 500 is to the proper phasing/pitch and indentation depth, and may also be used for determining whether the interfacing drive bodies 51 are of an acceptable phasing/pitch and teeth projection depth.

Due to the door structure 12 being extruded and/or pultruded as a continuous process, considerable energy can be saved, as a typical injection mold used for traditional sliding door production is no longer needed. The energy of heating up and cooling the mold and the injected material can be altogether eliminated. This resulting minimization of energy use in production allows for sliding doors to be produced for a lower cost and with a reduced environmental impact.

Another benefit in producing the door structure 12 in an extrusion and/or pultrusion process is that the door is no longer required to be made from a polymer/plastic material. This new freedom in choice of material allows the door structure 12 to be made of materials previously not considered, which could include waste products/materials, as desired. For example, the door structure 12 could be extruded and/or pultruded from wood pulp, recycled cardboard, other types of paper products, or other waste materials as desired. The aforementioned materials can also have additives such as waste rubber and/or other water resisting materials attuned to a desired material property, as desired.

Should any of the engagement elements 185, 285, 385 relying upon frictional engagement be utilized, a relatively low cost rubber may be utilized in forming the engagement elements 185, 285, 385 since the rubber only performs the task of transporting the door structure 12 in the specified direction with little resistance therealong. This enables the aforementioned engagement elements 185, 285, 385 to also be made from a waste material, such as shredded tires or other waste rubber materials, as desired.

As previously described, the resulting configuration of the channel 20 and drive body 51 is also far less dependent on precision molded and tolerance components. As a result of the disclosed design facilitating a reduced precision, it enables lower specification materials (including waste materials) that can be used to make the parts. The resulting design is thus easy to manufacture with a low scrap rate, the materials are of low specification, and these characteristics yield a design that can be produced with minimal environmental impact, case of supply chain selection, and at low cost.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A sliding door assembly comprising:

a door structure having a channel formed therein, the channel extending longitudinally in an axial direction of the door structure;

a first rotary drive structure configured for selective rotation about an axis of rotation thereof, the first rotary drive structure including a first drive body rotatably received within the channel of the door structure; and an engagement feature configured to transfer rotational motion of the first drive body about the axis of rotation of the first rotary drive structure to linear translation of the door structure with the channel along the axial direction thereof and relative to the axis of rotation of the first rotary drive structure.

2. The sliding door assembly of claim 1, wherein the door structure is formed by one of an extrusion process or a pultrusion process with the door structure extruded or pultruded in the axial direction thereof.

3. The sliding door assembly of claim 2, wherein the one of the extrusion process or the pultrusion process includes formation of the channel to have a constant cross-sectional shape extended in the axial direction of the door structure.

4. The sliding door assembly of claim 1, wherein the rotatable reception of the first drive body within the channel prevents movement of the door structure with respect to a lateral direction of the door structure arranged perpendicular to the axial direction thereof and parallel to the axis of rotation of the first rotary drive structure.

5. The sliding door assembly of claim 1, wherein the channel is centrally located on the door structure with respect to a lateral direction of the door structure arranged perpendicular to the axial direction thereof and parallel to the axis of rotation of the first rotary drive structure.

6. The sliding door assembly of claim 1, wherein the channel is formed between a first wall segment and a second wall segment of the door structure, wherein each of the first wall segment and the second wall segment projects outwardly from the door structure with respect to a thickness direction of the door structure.

7. The sliding door assembly of claim 6, wherein the first rotary drive structure further includes a first shaft segment extending laterally from a first lateral end face of the first drive body and a second shaft segment extending laterally from a second lateral end face of the first drive body, wherein the first shaft segment is rotatably disposed upon a distal surface of the first wall segment and the second shaft segment is rotatably disposed upon a distal surface of the second wall segment.

8. The sliding door assembly of claim 1, wherein the door structure is formed by an injection molding process.

9. The sliding door assembly of claim 1, wherein the engagement feature comprises the first drive body having a plurality of radially outwardly projecting teeth formed on an outer circumferential surface thereof and the door structure having a plurality of teeth receiving openings formed along the channel with each of the teeth receiving openings configured to receive a corresponding one of the teeth of the first drive body therein during rotation of the first rotary drive structure about the axis of rotation thereof.

10. The sliding door assembly of claim 9, wherein the teeth receiving openings are provided as one of indentations formed by deformation of the door structure or though-holes formed by penetration of the door structure.

11. The sliding door assembly of claim 1, wherein the engagement feature comprises an engagement element that is one of disposed circumferentially around an outer circumferential surface of the first drive body or disposed along the channel with respect to the axial direction of the door structure.

12. The sliding door assembly of claim 11, wherein the engagement element is formed from an elastomeric material.

13. The sliding door assembly of claim 1, wherein the engagement feature includes a drive belt looped around each of the first drive body of the first rotary drive structure and a second drive body of a second rotary drive structure spaced apart from the first rotary drive structure with respect to the axial direction of the door structure, the drive belt configured to engage the door structure along the channel thereof.

14. The sliding door assembly of claim 13, wherein the engagement feature further includes the drive belt having a plurality of outwardly extending teeth formed on an outer surface thereof and the door structure including a plurality of teeth receiving openings formed therein along the channel with each of the teeth receiving openings configured to receive a corresponding one of the teeth of the drive belt therein during rotation of the first rotary drive structure about the axis of rotation thereof.

* * * * *